March 26, 1940.   P. RAVIGNEAUX   2,194,954
SPEED CHANGING DEVICE
Filed Oct. 6, 1937   2 Sheets-Sheet 1
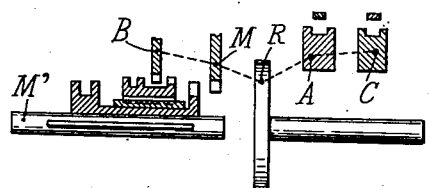
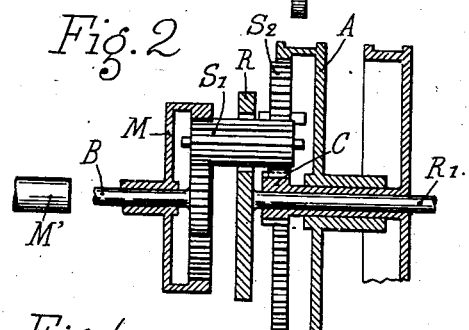
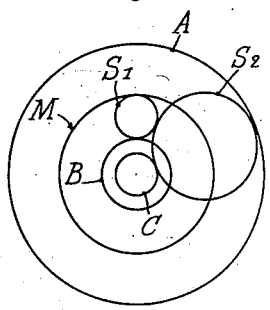
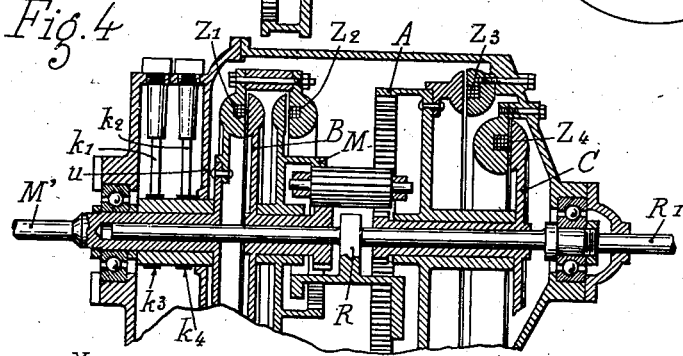
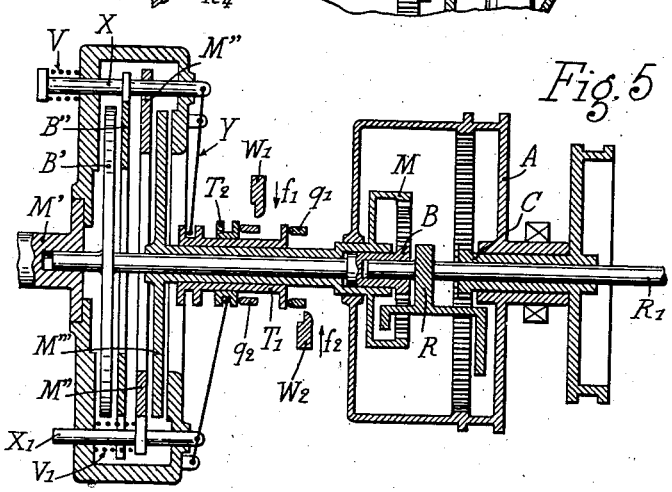
POL RAVIGNEAUX
INVENTOR
HIS ATT'Y.

March 26, 1940. P. RAVIGNEAUX 2,194,954
SPEED CHANGING DEVICE
Filed Oct. 6, 1937 2 Sheets-Sheet 2
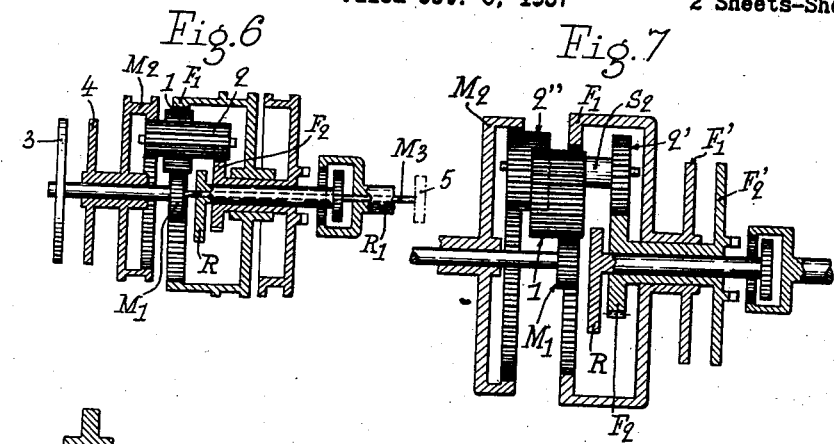
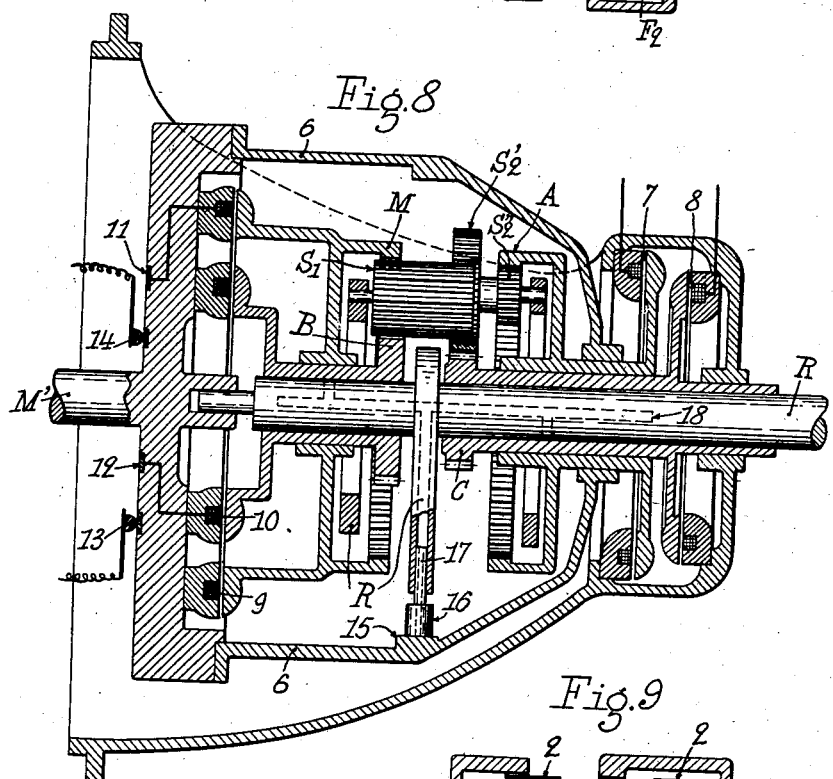
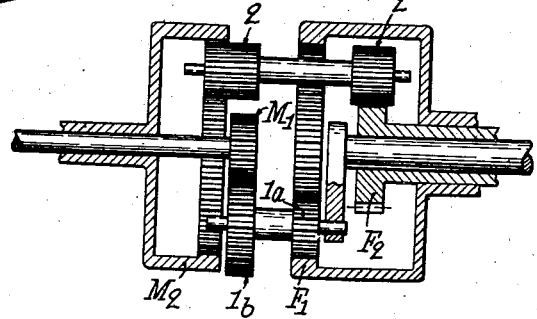
POL RAVIGNEAUX
INVENTOR Patented Mar. 26, 1940

2,194,954

UNITED STATES PATENT OFFICE 2,194,954

SPEED CHANGING DEVICE

Pol Ravigneaux, Neuilly-sur-Seine, France

Application October 6, 1937, Serial No. 167,487
In France October 9, 1936

15 Claims. (Cl. 74—270)

The present invention consists of an epicycloidal gear speed changing device comprising five members, two of which are alternately or simultaneously connected to the main driving shaft (or driven shaft), two members which are alternately or simultaneously held stationary, and a member which is always connected to the driven shaft (or driving shaft).

The invention will be more particularly described with reference to a speed changing device for motor vehicles in which stepwise varying speed ratios are to be observed.

The device according to the invention comprises two epicycloidal gear sets (each constituted of a central wheel, of an internal tooth ring, and of a planetary pinion having a single or a double toothing), the planetary pinions having their axles carried by the same carrier and being in respective gear engagement. Said device is used to provide for five positive or negative speed combinations by means of two clutching means and of two braking means.

The invention will now be described with reference to the accompanying drawings which are given solely by way of example, and in which:

Fig. 1 is a diagram showing the five concentric members and their connecting means.

Fig. 2 is a diagram in which the connections between the members are effected by means of gears and in which the driven shaft constitutes itself the planetary pinion carrier.

Fig. 3 shows the pitch diameters of the wheels of Fig. 2.

Fig. 4 shows an embodiment in which the clutching and braking means are operated electromagnetically.

Fig. 5 shows an embodiment of a motor vehicle speed changing device in which the two clutches, which are located at the exterior of the speed changing box, and the two brakes are operated mechanically.

Figs. 6 and 7 show modifications in which the sun wheel and the annulus of one epicycloidal gear set are respectively on opposite sides of the meshing surfaces of the sun wheel and the annulus of another epicycloidal gear set.

Figs. 8 and 9 show other modifications in which one of the planetary pinions has a multistep toothing.

On Fig. 1 the five members of the composite epicycloidal gear set M, A, B, C, R are connected together in such a manner that the speed of two of them being determined, (whereby one of said two speeds may be nil), the speed of all the others will also be determined. The connections are shown by dotted lines between the members.

In practice, considering one of the members, for example R as the planetary pinion carrier of the epicycloidal gear set, it will suffice, in order to provide for the indicated connections, the ratio of the speeds of B and M and the ratio of the speeds of A and C being determined, that a third connection provides for a given speed ratio between B or M on the one hand and A or C on the other hand.

With this arrangement, which is characterized by the fact that one or the other of two of said members may be driving members, or both, that one or the other of two other members may be held stationary and that the fifth member is always integral with the driven shaft, it is possible, if M is a driving member, to provide for two positive or negative speeds by braking A or C and it is further possible to provide for two other speeds when B is the driving member, that is four combinations to which must be added a direct drive when M and B are both connected to the drive. Eventually a braking combination may be provided when M and B are disconnected from the drive and the two brakes A and C are made operative.

Fig. 2 is a diagram corresponding to the above indicated characteristics, in which the number of teeth may be chosen so that the five speeds which may be obtained are distributed as follows:

Reduced speeds_____ 2
Direct drive_____ 1
Overdrive speed_____ 1
Reduced back drive_____ 1

A first epicycloidal gear set may for example comprise a central wheel B having 28 teeth connected to an annulus M having 62 teeth through a planetary pinion $S_1$ having 17 teeth and carried by a planetary pinion carrier R integral with the driven shaft $R_1$.

A second set comprises a central pinion C having 17 teeth connected to an annulus A having 101 teeth through a planetary pinion $S_2$ having 42 teeth, the axle of which is mounted on the same planetary pinion carrier R as the one of the other set, the two planetary pinions $S_1$ and $S_2$ being in respective gear engagement.

For this purpose, planetary pinion $S_1$ has a sufficient length to penetrate at the interior of the second set.

The main driving shaft M', supposed to be located at the left hand, may be connected either to the pinion B or to the annulus M, and either the inner ring A or the pinion C may be held stationary. With the combinations indicated below the following ratios are obtained, the members being cited in the following order: driving member, stationary member, driven member:

|  | Ratios obtained |
| --- | --- |
| First speed, MAR | 0.38 |
| Second speed, BCR | 0.62 |
| Third speed (direct drive by means of a double clutching) | 1 |
| Fourth speed, MCR | 1.378 |
| Back drive, BAR | 0.38 |

Fig. 4 shows an embodiment in conformity with the diagram of Fig. 2 in which the members M and B, which are capable of being rigidly connected to the driving shaft M' are connected to this shaft either or both through the medium of two electromagnets, to which the current is supplied through two brushes $k_1$, $k_2$ cooperating with two conductive rings $k_3$ and $k_4$, one of which is electrically connected to a first coil $z_1$ and the other to a second coil $z_2$.

The members A and C will be held stationary by supplying current to one or the other of the coils $z_3$, $z_4$. There will be provided in the members a slight axial clearance in order to permit the armatures to separate from the electromagnets when they are not attracted thereby.

The members A and C may be so arranged that they are displaced together in their axial displacements either to the left hand or to the right hand.

The driven shaft may traverse the whole device, which is advantageous for the proper centering of the members. By extending the driven shaft until the ball bearing is located adjacent the drive side, any other support can be dispensed with, thus providing for an economical manufacture.

The planetary pinion carrier may be forged and machined as a whole with the driven shaft, as the mounting is possible. In order to provide for a more ready machining, it will be sometimes mounted on flutes or grooves; the hub of this member may be easily located beneath the wheel B, the diameter of which is sufficient.

Said planetary pinion carrier thus does not necessitate any centering as it is mounted upon the driven shaft which is well supported between the outer bearings.

While being separated from the driven shaft, it may be constituted by a plurality of pieces in order to render its machining more easy.

It will be appreciated that a plurality of sets of planetary pinions might be distributed around the axis, in order to avoid all lateral stresses upon the central pieces.

In contradistinction to what happens in a great number of epicycloidal gear speed changing devices, there are very little superposed centerings between rotary pieces, two on the right hand and two on the left hand.

In this arrangement the brushes $k_1$, $k_2$ and the rings $k_3$ and $k_4$ may be readily insulated by means of a partition such as $u$, and this is advantageous for the quality of the electric contact.

The brushes might rub flatwise against plane concentric discs, thus reducing the overall size.

The annulus A might enclose the whole mechanism in order that, on the one hand, the gear mechanism shall be enclosed and not subjected to the metallic dusts, which may be produced in the braking or clutching members and on the other hand, that these clutching and braking operations may be effected in the dry state.

The clutching upon the member M would be effected on a flange externally secured to the casing enclosing the gears (as it is the case in the modification shown in Fig. 5).

In the modification shown in Fig. 5 the members M and B of the epicycloidal gear set both carry mechanical clutching elements M''' and B' located at the exterior of the casing.

The general clutch may then be dispensed with since either M or B may be connected to the driving member M'. The operation of the fork $q_1$ or $q_2$ unclutches the clutching element M''' or B' but a stop such as $w_1$ or $w_2$ when advanced in the direction of the arrow $f_1$ or $f_2$ prevents respectively M''' or B' from coming back into the clutching position, except for the direct drive. This arrangement has the advantage of eliminating a clutch and to leave to the driver the possibility of instantaneous unclutching and the control of the new clutching.

In the arrangement shown, note the combination of a double disc and plate clutch at the interior of a single casing which may be the flywheel of the engine.

A first disc B', integral with B, may be clamped between a bearing face of the flywheel and a plate B'' constantly urged towards the coupling position by means of springs such as V.

The movement towards the right of a rod X compresses the springs and provides for the uncoupling.

A number of rods, for example, three, are distributed over the circumference and the unclutching is effected in the usual manner through the medium of levers Y, by means of a fork $q_1$ acting upon a sleeve $T_1$ capable of sliding along the axle.

Another disc M''', integral with the annulus M, may be clamped between another face of the flywheel and a plate such as M'' urged towards the right by means of springs such as $V_1$.

A number of rods $X_1$, distributed over the circumference, may produce the unclutching when the driver acts upon a fork $q_2$ which acts upon a sliding sleeve $T_2$.

In this mechanism there is provided a number of thrust bearings, preferably of the ball type which are not shown.

The rods X and $X_1$, cooperating with one of the clutches, may be used to drive the plate constituting a part of the second clutch as shown in connection with the plate M''.

To permit of placing the spring $V_1$ at the interior of the flywheel, plate B'' is cut out.

All the clutching and braking operations may be effected by the use of an external power: depression within the suction pipe (with a vacuum vessel if necessary), hydraulic pressure created by a pump which may also be used simultaneously for other purposes or any other power.

The action of said external power may be direct and induce the clutching and braking operations or may be only used to counterbalance the action of the springs which act positively.

As shown in Fig. 1, the coupling between rotating pieces may be effected by means of claws and the braking by means of dogs (stationary claws) for the braked pieces.

It would be possible by the use of an arrangement similar to the one described and shown on the side of the driving shaft, to connect the driven shaft at will either to the planetary pinion carrier as supposed, or to the wheel C, so that by holding stationary the member A or the planetary pinion carrier, two further speeds could be obtained when B is the driving member that is four supplementary speeds.

Moreover it is obvious from Fig. 4 that said planetary pinion carrier is well within reach and that it would be an easy matter to secure to said carrier any braking mechanism.

Fig. 6 relates to a speed changing device providing for 5 or even 6 speeds, in which the two epicycloidal gear sets are crossed, i. e. the planetary pinions 2 of one set traverse the region in which the wheels $M_1$, 1 and F, of the other set are in meshing engagement. Said planetary pinion 2 meshes with its central wheel $F_2$ on one side of the central wheel $M_1$ of the other set and with its annulus $M_2$ on the other side of the annulus $F_1$ of said other set. Intermediately, it meshes with the planetary pinion of the other set. In some cases it is the central wheel $M_1$ of one of the sets which is the driving member and in another case it is the annulus $M_2$ of the other set.

The opposite central wheel $F_2$ and the opposite annulus $F_1$ are in turn braked to provide for the different speed combinations. The discs 3 and 4 have the same function as the discs B' and M''' of Fig. 5.

The planetary pinion carrier R is connected with the driven shaft $R_1$ for all the forward speeds: said carrier R is shown only partially for the purpose of clarity.

If the number of teeth of the wheels are chosen as follows:

$$\left\{\begin{array}{l} M_1=16 \\ F_1=50 \end{array}\right\} \text{ pinion } 1=17$$

$$\left\{\begin{array}{l} F_2=26 \\ M_2=58 \end{array}\right\} \text{ pinion } 2=16$$

the following ratios are obtained with the following combinations in which the members of the sets are indicated in the order: driving member, stationary member, driven member:

| 0.242 | 0.38 | 0.54 | 0.69 | 1 |
|---|---|---|---|---|
| $M_1F_1R$ | $M_1F_2R$ | $M_2F_1R$ | $M_2F_2R$ | direct drive |

The back drive may be obtained for example by connecting the driven shaft $R_1$ to the wheel $F_2$ and by employing the combination $M_1F_1F_2$.

In the above case, given by way of example, the ratio would be equal to (—0.223). It would also be possible to provide for the back drive by rendering $M_1$ driving and by holding stationary $M_2$ by means of friction means or claws.

In the example chosen, the reduction ratio obtained would be equal to (—0.38).

When, instead of providing for an axial transmission, the movement is to be transmitted to a parallel shaft or to a shaft which is perpendicular to the driving shaft, the shaft $M_1$ may be extended beyond $F_1$ and $F_2$ as shown in dotted lines at $M_3$. A braking of $M_3$ and consequently of $M_1$ on a pulley such as 5 will permit, by the combination $M_2M_1R$ of obtaining a sixth overdrive speed.

Fig. 7 shows an arrangement which may be employed when the annulus $F_1$ is smaller than the annulus $M_2$. It is then possible to cut out the planetary pinion $S_2$ separating two discs 2' and 2'' having the same toothing. The discs $F''_1$ and $F''_2$ represent braking elements similar to the clutching discs B' and B'' shown in Fig. 5.

Fig. 8 shows another modification in which the clutches and brakes are operated electromagnetically, and which provides for two reduced speeds, one overdrive speed and one reduced back drive.

The general arrangement might be used with mechanically operated clutches and brakes.

This arrangement consists in grouping the whole mechanism in a single casing 6 which is secured to the crank-shaft M' of the engine.

The brakes 7 and 8 may be placed under dry conditions at the exterior of said casing 6. The clutches 9 and 10 on the contrary operate in a lubricating bath.

The coils of the electromagnets are connected by electric wires to plane contact circles 11 or 12 or to cylindrical contact rings on which bear brushes 13 or 14. Said circles or rings being located on the front face of the flywheel are accessible and may be readily cleaned if necessary.

The fact that the mechanism and the oil which serves for its lubrication are enclosed in a casing rotating with the engine, afford a number of advantages and particularly this of eliminating completely the stirring and heating of the oil during the direct drive, and of reducing these two drawbacks in a great proportion at the great speeds for which the difference of speed between the engine and the driven shaft which is the planetary pinion carrier, is low.

This arrangement permits on the other hand a very compact grouping of the elements with a small size in length. As the casing 6 has little relation with the mechanism, it may be produced from pressed metal.

The whole is therefore of economical manufacture.

When the engine is running, the oil which is carried off by centrifugal force forms an annular sheet which covers the walls of the casing and which oil may be withdrawn by any suitable pump (carried for example by the planetary pinion carrier) in the same way as in the case of a stationary casing.

A guide-way such as 15 provided with bosses may serve as a bearing surface for a member 16 acting upon a piston 17 which forces the oil to come back towards the axis of the mechanism, for example in a channel 18 provided in the driven shaft R from where it will be directed towards the points to be lubricated: particularly the axles of the planetary pinions.

The lubrication is thus proportional to the difference of the speeds of the engine and of the driven shaft. At slow speeds, at which the gears work heavier, the lubrication is more abundant and this constitutes also a desirable result.

On this Figure 8 is also shown a modification relating to one of the epicycloidal gear sets $S_2$ being subdivided into two parts $S'_2$ and $S''_2$ having different numbers of teeth.

This feature affords numerous advantages.

The diameter of the annulus A is reduced and hence the general overall size of the speed gear box. It is possible to increase the diameter of the central wheel C and moreover, it is possible to readily provide for a slow speed and a very reduced back drive; for which an annulus of prohibitive dimensions should otherwise have to be used.

For example, if a speed changing device providing for four forward speeds (third speed direct drive and fourth speed overdrive) and a back drive, it will be possible with the following number of teeth:

$$\begin{cases} B=40 \\ M=74 \end{cases} S_1 = 17$$

$$\begin{cases} C=20 \\ A=76 \end{cases} \begin{array}{l} S'_2 = 40 \\ S''_2 = 16 \end{array}$$

to obtain the following ratios:

0.28  0.67  1  1.37  and  −0.27 with the respective combinations indicated below, in which the members are cited in the following order: driving member, stationary member, driven member:

MAR  BCR  (BM)R  MCR  BAR

In the same manner as in Fig. 2, the pinions carried by the same carrier mesh with each other. In the present case, the part S'₂ of S₂ meshes with S₁.

A second example is given hereafter with:

$$\begin{cases} B=35 \\ M=65 \end{cases} S_1 = 15$$

$$\begin{cases} C=18 \\ A=70 \end{cases} \begin{array}{l} S'_2 = 37 \\ S''_2 = 15 \end{array}$$

the same combinations would give the following ratios:

0.27  0.66  1  1.38  and  −0.26 while to obtain the same ratios with two sets of simple planetary pinions, use would have to be made of an annulus having a prohibitive number of teeth: 190 in the first example and 172 in the second. By adding an internally toothed annulus meshing with the part S'₂ of S₂, it will be possible to obtain, by clutching engagement of B or M and by braking said added annulus, a further forward reduced speed (ratio 0.49 in the first example and 0.48 in the second example) and a further reduced back drive (ratio: approximately −1 in the two examples).

In certain particular cases it would also be possible to divide the planetary pinion of the set BM in order either to increase the number of teeth of the annulus M or to reduce the same.

The arrangement with five speeds similar to that shown in Fig. 6, may also be provided with multistep planetary pinions, thus reducing the number of teeth of the greatest annulus and the size in diameter. This arrangement will be particularly employed when great speed reductions are required.

Fig. 9 shows an example of said arrangement. With a number of teeth as below:

$$\begin{cases} M_1 = 18 \\ F_1 = 94 \end{cases}$$ Planetary pinion $1b-1a = 44/32$ teeth $$\begin{cases} F_2 = 60 \\ M_2 = 90 \end{cases}$$ Planetary pinion $2 = 15$ teeth the above mentioned combinations, taken in the same order, permit of obtaining the following ratios:

0.12  0.23  0.41  0.60  1  −0.14

Having now described my invention what I claim as new and desire to secure by Letters Patent is:

1. A change speed gear comprising in combination a driving shaft, a driven shaft, an epicyclic assembly composed of five concentric members, that is two sun wheels, two annuli and a pinion carrier, and of at least one group of two pinions meshing with each other and rotatably mounted on said pinion carrier, one of said pinions meshing with one sun wheel and one annulus and the other pinion meshing with the other sun wheel and the other annulus, clutching means adapted to connect selectively said driving shaft separately with one sun gear and one annulus and simultaneously with the same sun gear and annulus, connecting means adapted to connect a third of said concentric members with said driven shaft, and locking means adapted to selectively lock against rotation the two other concentric members.

2. A change speed gear according to claim 1, in which said clutching means are adapted to connect selectively said driving shaft separately with one sun wheel, and its corresponding annulus and simultaneously with the same two members, said locking means are adapted to lock against rotation the other sun wheel and its corresponding annulus, and said connecting means are adapted to connect said pinion carrier with said driven shaft.

3. A change speed gear according to claim 1, in which said clutching means are adapted to connect selectively said driving shaft separately with one sun wheel and the annulus corresponding to the other sun wheel and simultaneously with the same two members, said locking means are adapted to lock against rotation the other sun wheel and the other annulus, and said connecting means are adapted to connect said pinion carrier with said driven shaft.

4. A change speed gear according to claim 1, in which said clutching means are mechanically operated clutching means.

5. A change speed gear according to claim 1, in which said clutching means are electromagnetically operated clutching means.

6. A change speed gear according to claim 1, in which said locking means are mechanically operated locking means.

7. A change speed gear according to claim 1, in which said locking means are electromagnetically operated locking means.

8. A change speed gear according to claim 1, in which an envelope connected to one of said annuli contains all said concentric members and pinions of said change speed gear, said clutching and locking means being situated out of said envelope.

9. A change speed gear according to claim 1, in which said pinion carrier is adapted for the centering of the other rotatable members.

10. A change speed gear comprising in combination a driving shaft, a driven shaft, an epicyclic assembly composed of five concentric members, that is two sun wheels, two annuli and a pinion carrier, and of at least one group of two pinions meshing with each other and rotatably mounted on said pinion carrier, one of said pinions meshing with one sun wheel and one annulus and the other pinion meshing with the other sun wheel and the other annulus, clutching means adapted to connect selectively said driving shaft separately with one sun gear and one annulus and simultaneously with the same two members, connecting means adapted to connect selectively said driven shaft with two other concentric members, and locking means adapted to selectively lock against rotation one of said two other concentric members and the fifth concentric member.

11. A change speed gear according to claim 10, in which said clutching means are adapted to connect selectively said driving shaft separately with one sun wheel and one annulus and simultaneously with the same two members, said connecting means are adapted to connect selectively said driven shaft with the other sun wheel and with said pinion carrier, and said locking means are adapted to selectively lock against rotation said other sun wheel and the other annulus.

12. A change speed gear according to claim 1, in which at least one of said pinions is formed of two parts having different diameters, one of said parts meshing with a sun wheel and the other part meshing with an annulus.

13. A change speed gear according to claim 1, in which a casing secured to said driving shaft and rotatable therewith contains all said concentric members and pinions and said clutching means, said locking means being situated out of said casing.

14. A change speed gear according to claim 1, comprising further a casing secured to one of said concentric members and adapted to contain oil, an oil pump formed of two parts movable with relation to each other and adapted to cooperate with each other so as to discharge oil towards the axis of the change speed gear, said parts being operatively connected with two of said concentric members.

15. A change speed gear according to claim 1, comprising further an oil pump carried by said pinion carrier, control members operatively connected with said driving shaft and operating means adapted to be actuated by said control members and to operate said pump.

POL RAVIGNEAUX.